United States Patent Office 3,382,144
Patented May 7, 1968

3,382,144
ALLYL DIALKYLTHIOLCARBAMATE
NEMATOCIDES
Marion Wesley Harman and John Joseph D'Amico, Dunbar, W. Va., assignors to Monsanto Company, a corporation of Delaware
No Drawing. Continuation of application Ser. No. 433,802, Feb. 18, 1965, which is a division of application Ser. No. 642,924, Feb. 28, 1957, and a continuation of application Ser. No. 319,629, Oct. 7, 1963. This application Oct. 12, 1966, Ser. No. 586,048
6 Claims. (Cl. 167—22)

This application is a continuation of Ser. No. 433,802 filed Feb. 18, 1965, said Ser. No. 433,802 being a division of Ser. No. 642,924 filed Feb. 28, 1957, and a continuation of Ser. No. 319,629 filed Oct. 7, 1963, said three prior applications being now abandoned.

This invention relates to bilologically active thiolcarbamates and to methods of pest control employing them. The invention includes methods of destroying or controlling undesired vegetation, fungi, and nematodes and relates to biologically active compositions useful for such purposes. More particularly, it relates to methods of destroying or controlling undesired vegetation and other pests which comprise applying thereto an effective concentration of a toxic ester of thiolcarbamic acid.

General objects of the invention are to provide compositions which are toxic to living plants, nematodes, fungi, or other pests or combinations thereof and to provide methods for their use to accomplish various desirable ends. Still another object is to provide methods for destroying nematodes. Other and further objects will be apparent from the detailed description which follows.

A method of destroying or controlling pests according to this invention comprises applying thereto an effective concentration of a toxic ester of a thiolcarbamic acid. It has been found that the biologically active thiolcarbamic acids those conforming to the structure

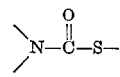

where R is an organic amino substituent having the nitrogen atom connected directly to the carbonyl radical and to two other carbon atoms and where R' represents an open-chain unsaturated group comprise an especially valuable class. The valences of the amino substituent represented by R are preferably satisfied by lower alkyl groups; but if the chain is interrupted by oxygen or sulfur, compounds having higher molecular weights maintain high biological activity. Moreover, heterocyclic amino substituents are especially efficacious. The unsaturated group represented by R' is preferably an alkenyl group either unsubstituted or substituted by halogen, although the presence of halogen serves significantly to increase the bilogical activity. Typical examples of R' comprise cis- and trans-2,3-dichloro-2-butenyl, 3-chloro-2-butenyl, 2-chloroally, 2-bromoallyl, 3-chloroallyl, cis- and trans-2,3-dichloroallyl, 3-iodoallyl, 3-iodo-2-butenyl, 2,3-diodo-2-butenyl, 2-fluoro-3-chloroallyl, vinyl, allyl, 2-butenyl, 4-chloro-2-butenyl, 2-iodoallyl, 3-bromoallyl, and 2,3-dibromoallyl. These are believed to be a new class of compounds.

The new toxicants may be applied conveniently in the form of a spray containing the active ingredient in a concentration within the range of 0.1%–10.0% by weight. At concentrations within the range of 35–100 pounds per acre, the new compounds are soil sterilants and destroy all plant life as well as destroying some animal pests.

Although most thiolcarbamates are isoluble in water they are soluble in organic solvents. Most of them are soluble in acetone, chloroform, ethyl alcohol, ethyl acetate, benzene, ether, and heptane. The esters may be dispersed directly in water or a solution in an organic solvent emulsified in aqueous medium by the aid of a dispersing agent. As dispersing and wetting agents, there may be employed soft or hard sodium or potassium soaps, alkylated aromatic sodium sulfonates such as sodium dodecyl benzene sulfonate, or an amine salt of dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents.

As explained above and as will be hereinafter illustrated in greater detail, the substitutents which are attached to the nitrogen of the

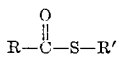

nucleus can be varied considerably. While the relationship between biological activity and structure is, to say the least, obscure, some generalities derived from study of a large number of different structures appear to be valid. The presence of hydrogen on the nitrogen affects activity profoundly. The compounds contemplated here have no hydrogen attached to the nitrogen. Aryl groups, as for example phenyl, alicyclic groups, as for example cyclohexyl, and alkyl groups, as for example benzyl, are less desirable; and in any event, not more than one radical should be selected from these types. Unsaturated radicals are contemplated, as for example cyclohexenyl, alkenyl, and halogen-substituted alkenyl. More than one halogen-substituted radical is usually not beneficial, and this includes the ester group as well. In other words, if the ester radical is halogen-substituted alkenyl, the presence of a second radical of this type on the nitrogen does not usually increase effectiveness. Similarly, with an unsubstituted-alkenyl group as the ester radical and a halogen-substituted alkenyl group attached to the nitrogen, the presence of a second halogen-substituted alkenyl group would be expected to decrease effectiveness.

While the alkyl thiolcarbamates examined had only a low order of activity, the unsaturated esters proved to be very valuable compounds. Cyclic groups, as for example cyclohexenyl, are desirable, but aromatic esters are not included. By nonaromatic is meant radicals which do not contain an aromatic ring linked directly to the sulfur. Thiazolyl esters, as for example 5-acetyl-4-methyl-2-thiazolyl diethylthiolcarbamate, are useful, these compounds being characterized by contact phytotoxicity to broadleaves.

Controlling harmful and unwanted parasites present in the soil, such as nematodes, is an important problem of considerable complexity. Some of the new compounds are effective for this purpose, notably halogen-substituted alkenyl esters of dimethylthiolcarbamate, as for example 2-chloroallyl and 2,3-dichloroallyl dimethylthiolcarbamate. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil, and possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

Nematocidal activity was demonstrated by preparing a suspension of the nematode *Panagrellus redivivus* in water and observing through a microscope the motility of the organisms in the presence of 0.1% of the test material. The nematode in aqueous suspension will flex its body at a regular rate; and as the nematocide takes effect, the rate of flexing is decreased until death of the parasite occurs. In this experiment the control containing no added toxicant showed undiminished activity after 24 hours, whereas complete destruction of the nematode was effected with 2-chloroallyl dimethylthiolcarbamate. Although less effective, activity as contact nematocides was exhibited by 3,3-dichloroallyl diethylthiolcarbamate, 2,3-dichloroallyl diethylthiolcarbamate, 2-bromoallyl diethylthiolcarbamate, and allyl dimethylthiolcarbamate.

In another experiment sterilized soil was infested with nematodes (*Meloidogyne* sp.) and different portions treated with solutions containing concentrations of 0.1 and 0.01% by weight of 2-chloroallyl dimethylthiolcarbamate. The treated soil was allowed to stand for a week, then two-week old tomato plants were transplanted in the test soil and also in untreated, heat-sterilized soil. The plants were allowed to grow for two months, then were harvested, the roots washed and examined for evidence of infection. Comparison to the untreated controls gave the phytotoxicity of the compound. The results showed no nematode infestation and no phytotoxicity in both the untreated and treated soils.

The nematocidal compositions attack the soil phase of the life cycle of nematode parasites which infest animals. Treating barnyards, chicken pens, stables, and other infested areas destroys eggs and infective larvae of many parasites which infest animals. Moreover, the compositions are effective for the control of nematodes in their environment which includes bodies of animals. They are toxic to other worms such as flukes and tapeworms.

In the use of 2-chloroallyl dimethylthiolcarbamate as a nematocide or soil fumigant, the active compound, diluted or undiluted, may be applied to the soil at rates of 10 to 500 pounds per acre. The preferred application for treating soils of average nematode infestation will be from 25 to 100 pounds per acre. Formulation may contain dispersants which aid uniform distribution.

Several methods are available for the preparation of thiolcarbamate esters. The halide corresponding to the desired ester is condensed with an alkali metal thiolcarbamate in one method. The alkali metal thiolcarbamates are available from reaction of carbonoxysulfide with amines in the presence of alkali. In another method a thionocarbamate ester is rearranged to a thiol ester by reaction with an alkyl halide. The rearrangement is accompanied by transesterification. Still another method is to condense a carbonyl halide with a mercaptan or mercaptide.

CIS- AND TRANS-2,3-DICHLOROALLYL DIMETHYLTHIOLCARBAMATE

A solution comprising 180 grams (1.0 mole) of 25% dimethylamine, 160 grams (1.0 mole) of 25% sodium hydroxide and 1000 ml. of water was prepared and carbonoxysulfide then bubbled in at 0°–5° C. for 25 minutes or until there was a gain in weight of 60.1 grams (1.0 mole). The reaction mixture was stirred at 0°–10° C. for one-half hour longer and the sodium dimethylthiolcarbamate obtained as a 9.16% solution.

To 347.5 grams (0.25 mole) of the sodium dimethylthiolcarbamate solution so prepared there was added with stirring 36.2 grams (0.25 mole) of cis- and trans-1,2,3-trichloro-1-propene, the stirring continued at 25°–30° C. for 24 hours, then the mixture heated at 50°–60° C. for 3 hours. After cooling to 20° C. the reaction mixture was extracted with 300 ml. of ethyl ether, the ether solution washed with water until the washings were neutral to litmus, dried over sodium sulfate, and the ether removed in vacuo at a maximum temperature of 80°–90° C./1–2 mm. The cis- and trans-2,3-dichloroallyl dimethylthiolcarbamate, an amber oil, was obtained in 65% theory yield. Analysis gave 33.02% chlorine as compared to 33.11% calculated for $C_6H_9Cl_2NOS$.

ALLYL DIMETHYLTHIOLCARBAMATE

Employing a quantity of the same sodium dimethylthiolcarbamate solution in the same proportion and under the same reaction conditions but replacing the cis- and trans-1,2,3-trichloro-1-propene by 19.1 grams (0.25 mole) of allyl chloride, allyl dimethylthiolcarbamate was obtained as an amber oil in 60.6% yield. Analysis gave 9.50% nitrogen and 22.30% sulfur as compared to 9.65% nitrogen and 22.07% sulfur calculated for $C_6H_{11}NOS$.

2-CHLOROALLYL DIMETHYLTHIOLCARBAMATE

In the same procedure and utilizing another portion of the sames alkali metal thiolcarbamate, 27.8 grams (0.25 mole) of 2,3-dichloro-1-propene was substituted for the cis- and trans-1,2,3-trichloro-1-propene. The 2-chloroallyl dimethylthiolcarbamate was obtained as an amber oil, B.P. 112°–114° C./4 mm. Analysis gave 7.35% nitrogen and 18.11% sulfur as compared to 7.80% nitrogen and 17.84% sulfur calculated for $C_6H_{10}ClNOS$.

The same compound was prepared from ethyl dimethylthionocarbamate. To 133.2 grams (1.0 mole) of ethyl dimethylthionocarbamate was added with stirring 150 grams (1.35 moles) of 2,3-dichloro-1-propene. The stirred reaction mixture was heated at 110°–1150 C. for 48 hours and then distilled to yield 2-chloroallyl dimethylthiolcarbamate, B.P. 112°–113° C./4 mm., in 46.9% yield. Analysis gave 7.78% nitrogen and 17.68% sulfur as compared to 7.80% nitrogen and 17.84% sulfur calculated for $C_6H_{10}ClNOS$.

3,3-DICHLOROALLYL DIMETHYLTHIOLCARBAMATE

To a stirred solution comprising 180 grams (1.0 mole) of 25% dimethylamine, 160 grams (1.0 mole) of 25% sodium hydroxide, and 1000 ml. of water there was bubbled in carbonoxysulfide at 0°–5° C. until there was a gain in weight of 75 grams (1.25 moles). The solution was stirred for an additional hour at room temperature and to this solution 145.3 grams (1.0 mole) of 1,1,3-trichloro-1-propene were added in one portion. Stirring was continued for 25 hours at room temperature and the reaction mixture extracted with 500 ml. of ethyl ether. The ether solution was washed with water until the washings were neutral to litmus, dried over sodium sulfate, and the ether removed in vacuo. Distillation of the reaction mixture under 4 mm. pressure gave an amber oil, B.P. 138°–140° C. The 3,3-dichloroallyl dimethylthiolcarbamate so obtained analyzed 6.54% nitrogen and 14.45% sulfur as compared to 6.54% nitrogen and 14.98% sulfur calculated for $C_6H_9Cl_2NOS$.

3,3-DICHLOROALLYL DIETHYLTHIOLCARBAMATE

A 12.7% aqueous solution of sodium diethylthiolcarbamate was prepared by mixing 146.3 grams (2.0 moles) of diethylamine, 320 grams (2.0 moles) of 25% sodium hydroxide, and 2000 ml. of water. To this solution, with stirring at 0° C., there was bubbled in carbonoxysulfide until the gain in weight was 146 grams. The solution was stirred for an additional 2 hours at 0°–5° C.

To 412.5 grams (0.33 mole) of the sodium diethylthiolcarbamate solution so prepared there was added in one portion with stirring 36.4 grams (0.25 mole) of 1,1,3-trichloro-1-propene. The stirred mixture was heated at 50°–60° C. for 3 hours and then maintained at 25°–30° C.

for 12 hours. The product was extracted with 300 ml. of ethyl ether, the ether solution washed with water until the washings were neutral to litmus, and dried over sodium sulfate. The ether was removed in vacuo at a maximum temperature of 80°–90° C./1–2 mm. The 3,3-dichloroallyl diethylthiolcarbamate so obtained was an amber oil. Analysis gave 5.79% nitrogen, 13.28% sulfur, and 29.95% chlorine as compared to 5.78% nitrogen, 13.24% sulfur, and 29.28% chlorine calculated for $C_8H_{13}Cl_2NOS$.

Employing a quantity of the same sodium diethylthiolcarbamate, the following compounds were also prepared according to the procedure for 3,3-dichloroallyl diethylthiolcarbamate:

CIS- AND TRANS-2,3-DICHLOROALLYL DIETHYLTHIOLCARBAMATE

An amber oil analyzing 5.59% nitrogen, 13.05% sulfur, and 29.61% chlorine as compared to 5.78% nitrogen, 13.20% sulfur, and 29.20% chlorine calculated for $C_8H_{13}Cl_2NOS$.

ALLYL DIETHYLTHIOLCARBAMATE

An amber oil analyzing 8.03% nitrogen and 18.43% sulfur as compared to 8.08% nitrogen and 18.50% sulfur calculated for $C_8H_{15}NOS$.

2-BROMOALLYL DIETHYLTHIOLCARBAMATE

An amber oil analyzing 5.43% nitrogen and 31.40% bromine as compared to 5.54% nitrogen and 31.65% bromine calculated for $C_8H_{14}BrNOS$.

2-CHLOROALLYL DIETHYLTHIOLCARBAMATE

An amber oil analyzing 6.94% nitrogen and 15.78% sulfur as compared to 6.74% nitrogen and 15.44% sulfur calculated for $C_8H_{14}ClNOS$.

The formulation of dry compositions for application as dusts or for further dilution with liquid carriers is readily accomplished by mixing the ester with a finely divided carrier. The latter will usually be in major proportion. Suitable carriers comprise talc, clay, pyrophylite, silica, and fuller's earth.

It is intended to cover all changes and modifications of the examples of the invention herein chosen for purposes of disclosure which do not constitute departures from the spirit and scope of the invention.

What is claimed is:

1. The method of destroying parasitic worm life which comprises contacting the said organism with a toxic concentration of a thiolcarbamate of the formula

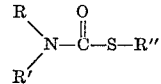

where R and R' are alkyl of less than three carbon atoms and R" is selected from a group consisting of allyl, bromoallyl, and chloroallyl.

2. The method of claim 1 in which the parasitic worm life is nematodes, where R and R' are alkyl of less than three carbon atoms, and R" is dichloroallyl.

3. The method of claim 1, where the parasitic worm life is nematodes in agricultural soils, R and R' are methyl, and R" is 2-chloroallyl.

4. The method of claim 1 where the parasitic worm life is nematodes in agricultural soils, R and R' are methyl, and R" is allyl.

5. The method of claim 1 where the parasitic worm life is nematodes in agricultural soils, R and R' are ethyl, and R" is 2-bromoallyl.

6. The method of destroying parasitic worm life in agricultural soils which comprises contacting the said organism with a toxic concentration of 2-chloroallyl dimethylthiolcarbamate.

References Cited

UNITED STATES PATENTS

| | | | |
|---|---|---|---|
| 2,677,698 | 5/1954 | Deutschman | 260—482 |
| 2,882,291 | 4/1959 | Harman | 167—22 |
| 2,895,980 | 7/1959 | Harman | 167—22 |
| 2,905,586 | 9/1959 | Harman | 167—22 |
| 2,943,972 | 7/1960 | Meine Van Der Kerk | 167—22 |
| 2,990,319 | 5/1961 | Jones | 167—22 |

ALBERT T. MEYERS, *Primary Examiner.*

J. D. GOLDBERG, *Assistant Examiner.*